Patented Jan. 15, 1929.

1,699,257

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

PROCESS OF AND MATERIAL FOR TREATING SEWAGE AND INDUSTRIAL WASTE.

No Drawing. Application filed May 27, 1927. Serial No. 194,864.

This invention relates to and has for its object, the provision of a process of and material for treating polluted fluid waste from the manufacture of strawboard, hereinafter designated "strawboard waste."

This strawboard waste is the composite of three separate portions from three distinct processes, namely, drainage from the stock, wash from the beaters, and wash from the machines including the felt wash. The most concentrated and polluting of the three is the wash from the beaters. The wash from the machines consists almost entirely of fiber in a fine state of suspension.

The alkaline and highly turbid character of the waste makes it especially harmful to fish life. The coloring matter is very stable and while relatively harmless, nevertheless produces an undesirable condition in the stream of water or body of water into which the waste is discharged. While this waste does not in itself contain any infectious matter, it does, however, draw upon the stream's natural purifying power, thereby delaying or preventing the ultimate purification of such infectious matter as may be present in the stream. The oxygen demand on a stream or body of water receiving this waste is enormous. Analysis of typical strawboard waste discloses the following:

| | |
|---|---|
| Total solids | 10700 P. P. M. |
| Solids in suspension | 1525 P. P. M. |
| Organic matter in suspension | 810 P. P. M. |
| Organic matter (colloidal-true sol.) | 6101 P. P. M. |
| Total organic matter | 6911 P. P. M. |
| Mineral matter in suspension | 715 P. P. M. |
| Mineral matter in solution | 2583 P. P. M. |
| Total mineral matter | 3298 P. P. M. |
| Total alkalinity as calcium hydrox | 2287 P. P. M. |
| Oxygen demand (10 days 20 degrees) | 1175 |
| Dilution required | 235 to 1 |

This waste contains 627.9 grains of solids per gallon. Approximately 70% of these solids are organic matter and approximately 10% of the organic matter is in suspension and 90% colloidal and in true solution. It is apparent that the removal of the suspended matter would only improve the waste about 10%. The remaining 90% of the organic matter which consists of the colloidal matter and the organic matter in true solution, must of necessity be dealt with. My process contemplates a reduction in both of these items and the production of a suitable purified effluent.

The pollution of water into which industrial waste, such as strawboard waste, is discharged is to a large extent dependent upon the amount of water available to dilute the waste. Where only a small amount of dilution is available, it is essential that the waste be purified to such a degree as will permit it to be taken care of by the available dilution. It follows that in some instances a greater degree of purity of the waste is necessary than in others.

My process enables the treatment of the waste in a manner that will secure the necessary degree of purity to prevent pollution of a stream or body of water into which the waste is discharged. I have successfully treated strawboard waste by my process and produced an effluent sufficiently pure to require a dilution as low as 13 to 1. A much greater dilution is sometimes available and under such conditions an effluent may be produced which will require a somewhat greater dilution. It will be appreciated that the higher the degree of purity of the effluent, the greater the expense of purifying the waste. Accordingly, it is economically sound to regulate the degree of purity of the effluent depending upon the available dilution.

My specific process comprises two steps. If a maximum purification of the waste is required, both the steps are employed. When, however, sufficient dilution is available, the second step of my process may not be essential and can be dispensed with.

The first step in my process comprises introducing to the strawboard waste a mixture of calcium sulphate and calcium hydrate, the ratio of calcium sulphate to calcium hydrate in the mixture being substantially 7 to 1. The mixture may be added to the waste in proportions of 16 pounds of the mixture to each one thousand gallons of waste treated. While I specifically mention and prefer to use calcium sulphate, I wish to be understood that I may employ magnesium sulphate or the salt of bivalent or trivalent metals.

It will be understood that the ratio of calcium sulphate and calcium hydrate to the quantity of the mixture above stated are merely illustrative and may be varied depending upon the specific character of the waste under treatment. I find, however, that the calcium sulphate should always be employed in the mixture in an amount in excess of the calcium hydrate. The quantity of the mixture best suited for the treatment of a specific waste may be determined by making trial tests and noting the results obtained as, for example, the clarification of the liquid, size of the floc, and the rapidity of precipitation. The quantity of the mixture employed may be varied depending upon the waste treated. Generally speaking a dilute waste requires a smaller quantity than a more concentrated waste. Ordinarily good results can be obtained by using from 5 to 20 pounds of the treating mixture per 1000 gallons of waste treated.

The waste to which the mixture has been added is mildly agitated or stirred to uniformly distribute the mixture through the waste. The precipitated matter is permitted to settle. The colloids present in the waste are, during the first step of my process, changed from a state of dispersion to one of suspension. There is also a distinct coagulation and settling out of the previously colloidal matter. By subjection to the single step above defined, I have successfully lowered the dilution required for the waste undergoing treatment from as high as 235 to 1 for the untreated waste to 42 to 1 for the effluent produced by the first step in my process.

It will, therefore, be apparent that if a dilution of 42 to 1 or above is available, the second step of my process may be advantageously and economically dispensed with. In many cases, however, the dilution available is small and in such cases, the second step of my process becomes peculiarly important.

In the second step of my process I take effluent produced in the first step which still contains particles in suspension and subject this effluent to the action of of the mixture composed of (a) waste dust collected from the precipitators employed in the manufacture of cement, (b) ferrous sulphate, and (c) monocalcium phosphate, (i. e.) the primary phosphate of calcium. I may use calcium sulphate, magnesium sulphate, on a pulverized solid material recovered from the waste solutions discharged from an alkali plant during the manufacture of chlorine, chloride of lime and caustic soda in lieu of (a) waste dust from the manufacture of cement. I may also use aluminum sulphate in lieu of ferrous sulphate. I find, however, that the use of monocalcium phosphate is particularly important and advantageous.

In carrying out the second step of my process the ingredients in the mixture may be employed in the following proportions: (a) waste dust from the manufacture of cement, 2 pounds per thousand gallons of strawboard waste treated, (b) ferrous sulphate, 3 pounds per thousand gallons of strawboard waste treated, and (c) monocalcium phosphate .4 pounds per thousand gallons of strawboard waste treated.

The monocalcium phosphate may be employed either with or without two molecules of water of crystallization. The ratio between the several ingredients in the treating mixture used in step 2 of my process may be maintained substantially as given, that is, 37.05% waste dust, 55.55% ferrous sulphate and 7.4% calcium mono-phosphate, or the percentage composition of the several ingredients may be varied within fairly wide limits, the waste dust and ferrous sulphate always constituting the predominating constituents of the mixture. The quantity of the treating mixture used in step 2 of my process may be determined as in step 1 of my process.

By the second step of my process I am able to lower the dilution required for the effluent to as low as 13 to 1. I attribute the beneficial results flowing from the second step of my process largely to the persence of the monocalcium phosphate. The effectiveness of the monocalcium phosphate is due to its affinity for calcium hydroxide. The two combine to form di-basic calcium phosphate, the reaction being:

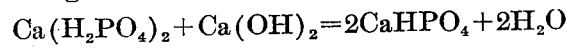
$Ca(H_2PO_4)_2 + Ca(OH)_2 = 2CaHPO_4 + 2H_2O$

The di-basic calcium phosphate at the instant of its formation, gathers together and holds the suspended matter in the solution and the two settle from the solution together.

The mono-basic calcium phosphate being acid in character, furthermore unites with the calcium hydrate, distinctly lowering the alkalinity of the solution without, however, rendering the effluent acid in character.

The phosphates are completely recovered in the precipitated sludge and very greatly enhance the value of the sludge as a fertilizer. These phosphates are found to be present in the sludge in what is commonly known as the "available condition."

An analysis of the strawboard waste has been given earlier in the specification. The following constitutes an analysis of the effluents produced by the first step of my process:

| | |
|---|---|
| Total organic matter | 4210 P. P. M. |
| Suspended matter | 45 P. P. M. |
| Organic matter in suspension | 22 P. P. M. |
| Phosphates (complete recovery) | None |
| Alkalinity as $Ca(OH)_2$ | 1120 |
| Oxygen demand (unaerated 10 days) | 425 |
| Oxygen demand (aerated 10 min.) | 320 |
| Oxygen demand (aerated 20 min.) | 210 |
| Dilution required (last item) | 42 to 1 |

The effluent produced by employing both steps one and two of my process shows upon analysis:

| | |
|---|---|
| Total solids | 4500 P. P. M. |
| Phosphates (complete recovery) | None |
| Solids in suspension | 10 P. P. M. |
| Total organic matter | 2120 P. P. M. |
| Total mineral matter | 2380 P. P. M. |
| Oxygen demand (10 days 20 C) | 240 |
| Oxygen demand (aerated 10 min.) | 117 |
| Oxygen demand (aerated 20 min.) | 65 |
| Dilution necessary (last item) | 13 to 1 |

From the foregoing description it will be apparent that I have provided an economical process for treating strawboard waste by which the desired degree of purification of the waste may be obtained so that the effluent can be cared for by the dilution that is available. The process is advantageous from an economical standpoint inasmuch as the sludge produced has a market value equal to or above the cost of the agents utilized in the treatment of the waste.

Having described my invention, what I claim is:—

1. A process for treating strawboard waste comprising initially subjecting the waste to the action of calcium sulphate and calcium hydrate, permitting the precipitated matter to settle, removing the effluent, subjecting such removed effluent to the action of a mixture containing monocalcium phosphate.

2. A process for treating strawboard waste comprising initially subjecting the waste to the action of calcium sulphate and calcium hydrate, permitting the precipitated matter to settle, removing the effluent, subjecting such removed effluent to the action of a mixture containing waste dust collected from the precipitators employed in the manufacture of cement.

3. A process for treating strawboard waste comprising initially subjecting the waste to the action of calcium sulphate and calcium hydrate, permitting the precipitated matter to settle, removing the effluent, subjecting such removed effluent to the action of a mixture containing waste dust collected from the precipitators employed in the manufacture of cement, ferrous sulphate and monocalcium phosphate.

4. A primary step in a process for treating strawboard waste comprising introducing to the waste a mixture containing calcium sulphate and calcium hydrate in the proportions of substantially 7 to 1, stirring the waste and permitting the precipitated matter to settle.

5. The steps in the process of treating strawboard waste comprising introducing to the waste a mixture of calcium sulphate and calcium hydrate, the quantity of calcium sulphate being in excess of the quantity of calcium hydrate permitting the precipitated matter to settle and reacting on the effluent with a reagent capable of combining with the calcium hydroxide therein to form dibasic calcium phosphate.

6. A step in the process of treating strawboard waste comprising subjecting a partially purified effluent to the action of monocalcium phosphate.

7. A step in the process of treating strawboard waste comprising subjecting a partially purified effluent to the action of waste dust collected from the precipitators employed in the manufacture of cement and monocalcium phosphate.

8. A step in the process of treating strawboard waste comprising subjecting an effluent produced by a prior step in the process to the action of a mixture containing waste dust collected from the precipitators employed in the manufacture of cement, ferrous sulphate and monocalcium phosphate.

9. A mixture for use in the treatment of strawboard waste including waste dust collected from the precipitators employed in the manufacture of cement, ferrous sulphate, and monocalcium phosphate.

10. A process for treating strawboard waste containing organic matter in colloidal form comprising transforming the colloids in the waste into suspensoids by destroying their stability through the agency of a chemical reagent and coagulating the suspensoids formed as a result of the destruction of the stability of the colloids, said coagulation being effected by the introduction of a coagulating agent containing monocalcium phosphate.

May 24, 1927.

JOHN T. TRAVERS.